United States Patent
Oehmann

(10) Patent No.: US 7,973,263 B2
(45) Date of Patent: Jul. 5, 2011

(54) MIRROR GLASS COMPONENT WITH INTEGRATED ILLUMINATING MEANS

(75) Inventor: Ronald Oehmann, Stuttgart (DE)

(73) Assignee: SMR Patents S.a.r.l., Luxembourg (LU)

( * ) Notice: Subject to any disclaimer, the term of this patent is extended or adjusted under 35 U.S.C. 154(b) by 966 days.

(21) Appl. No.: 10/560,411

(22) PCT Filed: Jun. 9, 2004

(86) PCT No.: PCT/DE2004/001185
§ 371 (c)(1),
(2), (4) Date: May 1, 2006

(87) PCT Pub. No.: WO2004/113123
PCT Pub. Date: Dec. 29, 2004

(65) Prior Publication Data
US 2007/0272672 A1 Nov. 29, 2007

(30) Foreign Application Priority Data

Jun. 13, 2003 (DE) .................................. 103 27 072

(51) Int. Cl.
*H05B 3/84* (2006.01)
(52) U.S. Cl. .................... 219/209; 219/201; 219/202
(58) Field of Classification Search .................. 219/209, 219/202, 201; 362/494, 155, 547, 285; 359/15, 359/839, 844
See application file for complete search history.

(56) References Cited

U.S. PATENT DOCUMENTS

| 5,151,824 | A | * | 9/1992 | O'Farrell | 359/604 |
| 5,669,699 | A | * | 9/1997 | Pastrick et al. | 362/494 |
| 6,139,171 | A | * | 10/2000 | Waldmann | 362/494 |
| 6,227,689 | B1 | * | 5/2001 | Miller | 362/494 |
| 6,347,880 | B1 | * | 2/2002 | Furst et al. | 362/494 |
| 6,476,358 | B1 | | 11/2002 | Lang et al. | |
| 6,582,109 | B2 | * | 6/2003 | Miller | 362/494 |
| 6,616,314 | B2 | | 9/2003 | Thau | |
| 6,657,767 | B2 | * | 12/2003 | Bonardi et al. | 359/265 |
| 2002/0126497 | A1 | * | 9/2002 | Pastrick | 362/494 |
| 2002/0171954 | A1 | * | 11/2002 | Bonardi et al. | 359/877 |
| 2005/0276058 | A1 | * | 12/2005 | Romas et al. | 362/494 |

* cited by examiner

*Primary Examiner* — Geoffrey S. Evans
*Assistant Examiner* — Vinod D Patel
(74) *Attorney, Agent, or Firm* — Reising Ethington P.C.

(57) ABSTRACT

The invention concerns a vehicle outside mirror module with a heatable mirror glass assembly group, whereby the mirror glass assembly group exhibits at least one mirror glass and an at least one layered, foil-like heating foil, flexibly configured on the back side of said mirror glass, provided with power supply points. To this end, there are configured or integrated, on or in the heating foil, at least one means of lighting and at least one additional power supply point. On or in the heating foil, between the one or the several lighting means and the one or the additional power supply points, are configured or integrated conductive tracks providing current which contact said power supply points. Each lighting means has at least one main light exit surface whose spectral centroid lies above the mirror back surface.

Figure 1:
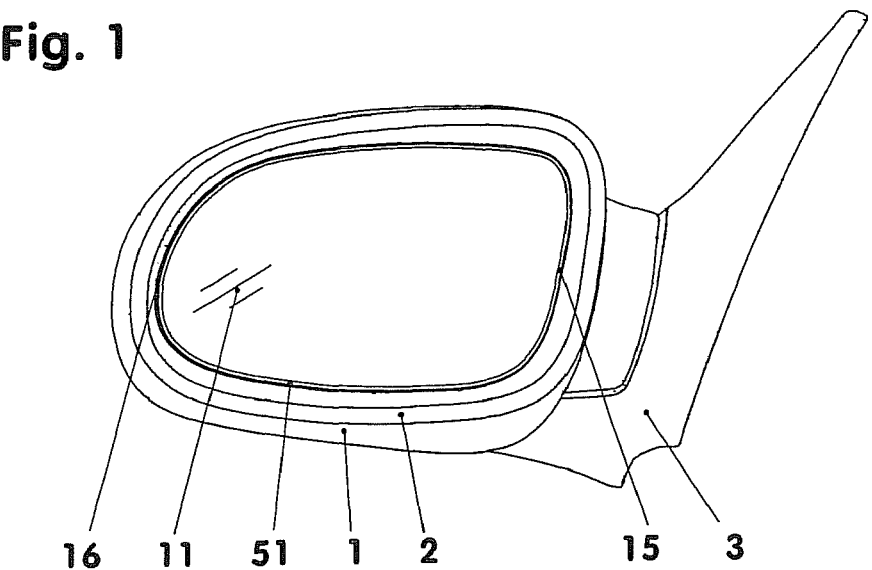

With the current invention, a vehicle outside mirror module is developed in which a mirror heater and at least one means of lighting are integrated and connected in such a manner that they can be simply and securely assembled while keeping the expenditure in cabling low.

8 Claims, 5 Drawing Sheets

MIRROR GLASS COMPONENT WITH INTEGRATED ILLUMINATING MEANS

The invention concerns a vehicle outside mirror module with a heatable mirror glass assembly group, whereby the mirror glass assembly group exhibits at least one mirror glass and an at least one layered, foil-like heating foil, flexibly configured on the back side of said mirror glass provided with power supply points.

An outside mirror is known from the German patent DE 20 34 741 OS in which a plastic film is arranged behind the mirror glass, on which a heating element is applied with a meandering layout. The heating element, for example, is a heating wire or a lamellar metal layer applied by vapor deposition, by imprinting or by electrodeposition.

Furthermore, known from the German patent DE 199 59 609 A1, is an outside rear mirror in whose housing are configured several means of illumination in the form of light emitting diodes.

Now, if a heating foil and additional lighting means are used in a vehicle outside mirror module, then both are electrically connected to the vehicle's electric system separately.

Therefore, the current invention sets out to solve the problem of developing a vehicle outside mirror module in which a mirror heater and at least one means of lighting are integrated and connected in such a manner that they can be simply and securely assembled while keeping the expenditure in cabling low.

This problem set forth is solved by means of the characteristics of the primary patent claim. To this end, on or in the heating foil comprised of at least one heating element, are configured or integrated at least one means of lighting and at least another power supply point. On or in the heating foil, between the one or several lighting means and between the one or several power supply points, current carrying conductive tracks are configured or integrated that contact said power supply points. Each lighting means has at least one main light exit surface whose spectral centroid lies above the mirror back surface.

As a rule, the lighting means integrated into the outside mirror module are light emitting diodes. However, they can also be luminous foils, illumination rods, gas lamps, incandescent filament lamps and such similar. These means of lighting are configured next to their wiring on the heating foil in addition to the configuration of the heating element. After the deposition/application of the heating tracks and conductive tracks, the heating foils are equipped with the lighting means and given the case, with the connector elements. The equipped heating foil is then united, for example by adhesion, with the mirror glass and with a mirror glass support to form a mirror glass assembly group.

In the case of a mirror glass assembly group in which the edge of the mirror glass is circumscribed by a mirror glass frame, the lighting means secured to the heating foil are usually applied to the seating surface without a separate mounting fixture in the hollow chamber of the mirror glass frame. At those points of the frame where lighting means are accommodated, the frame has individual openings or transparent points through which the light emitted by the lighting means exits.

By insertion and adhesion of the usually thin heating foils/films, the lighting means are assembled together with the mirror heating in a simple manner. Since the heating and the lighting means exemplarily exhibit a common terminal connector or a common connector plug, the connection of the outside mirror module to the vehicle is further simplified.

Additional details of the invention emerge from the subclaims and from the following description of several schematically represented forms of embodiment.

Figure 3:
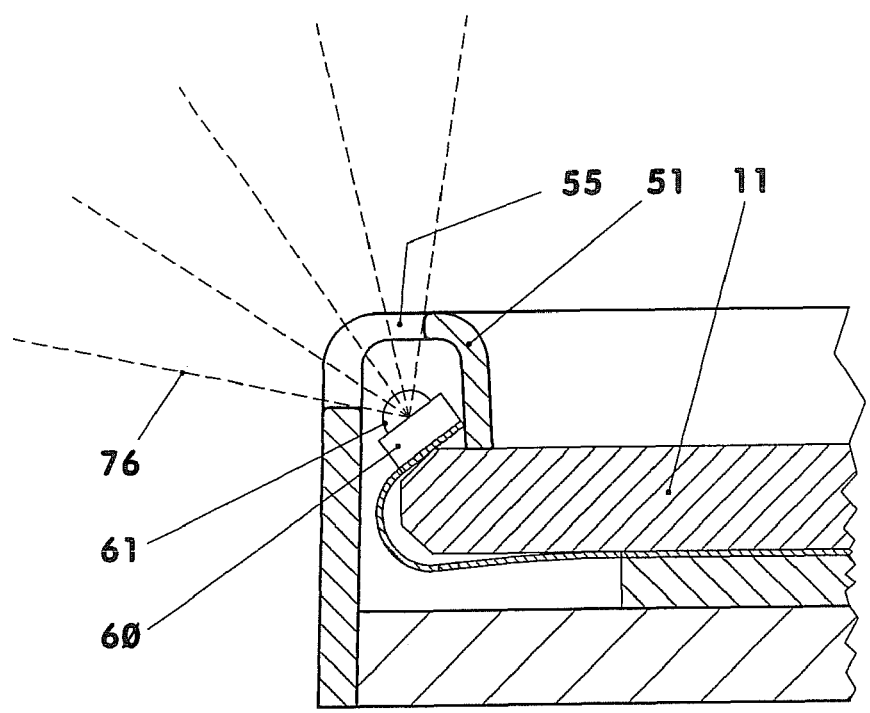
Figure 2:
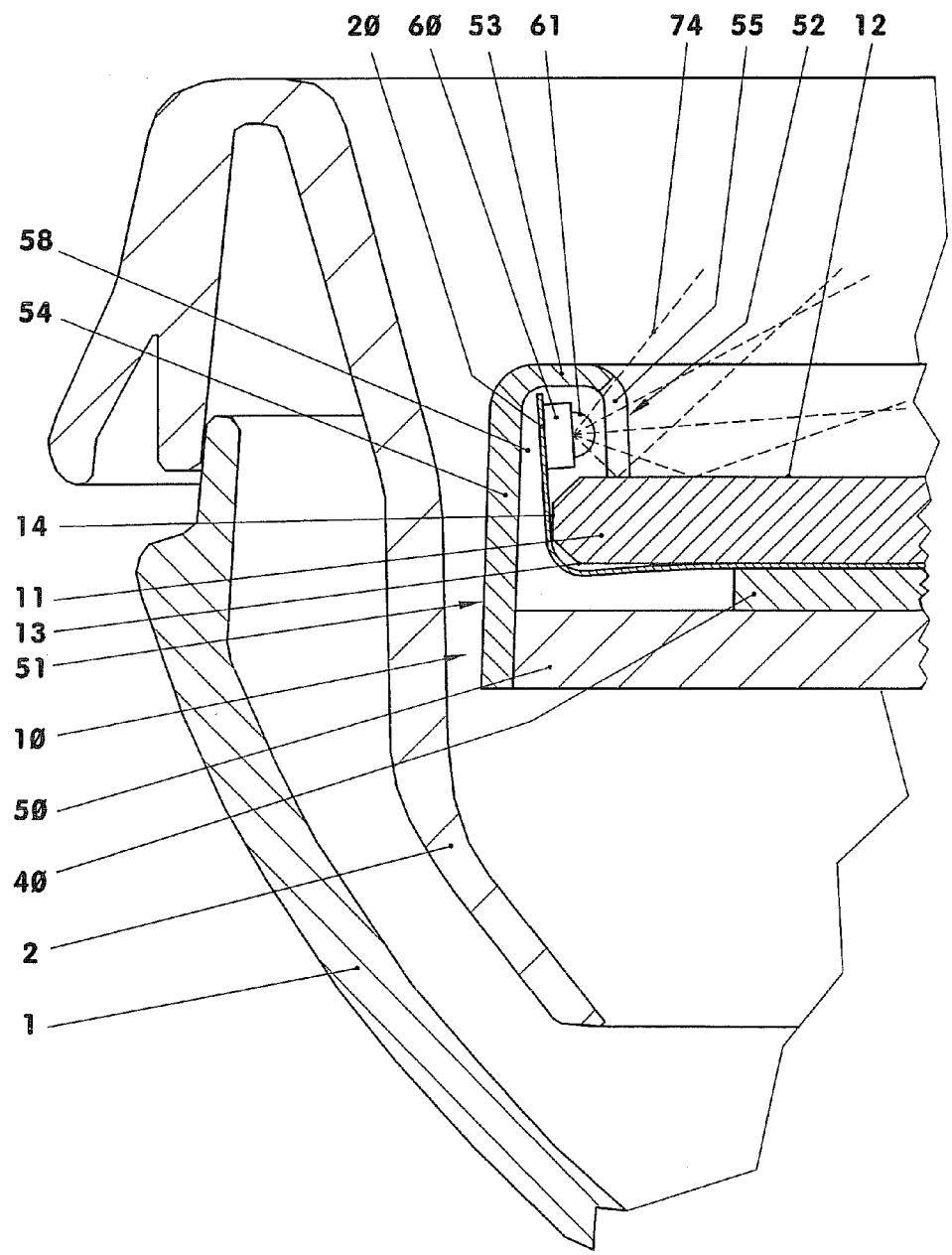
Figure 4:
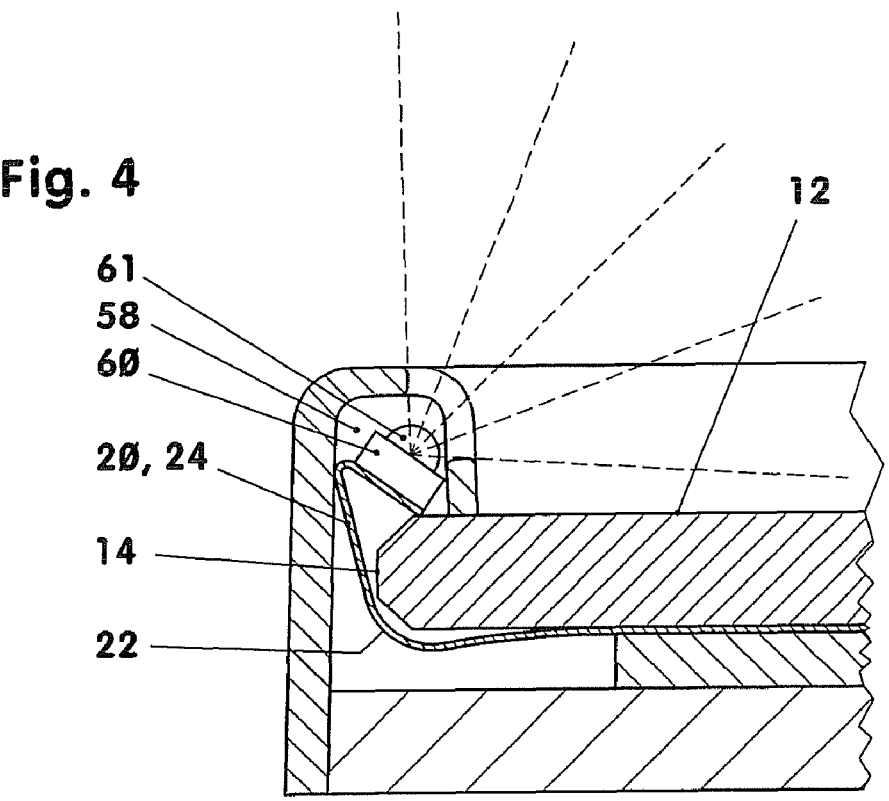
Figure 5:
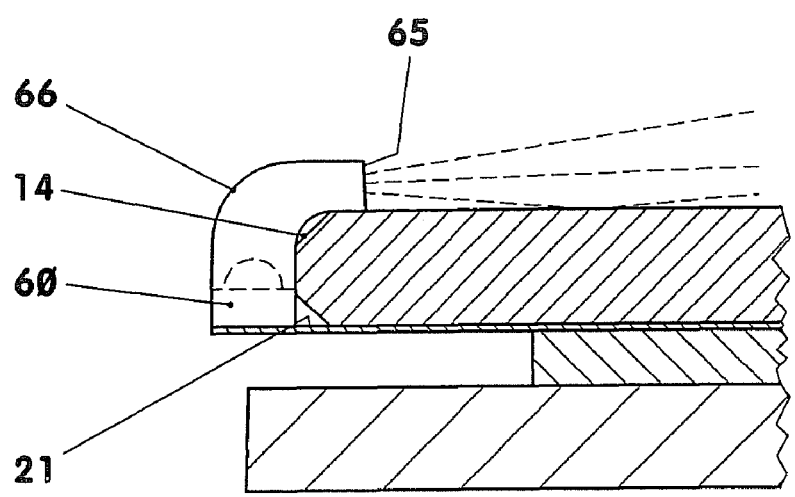
Figure 6:
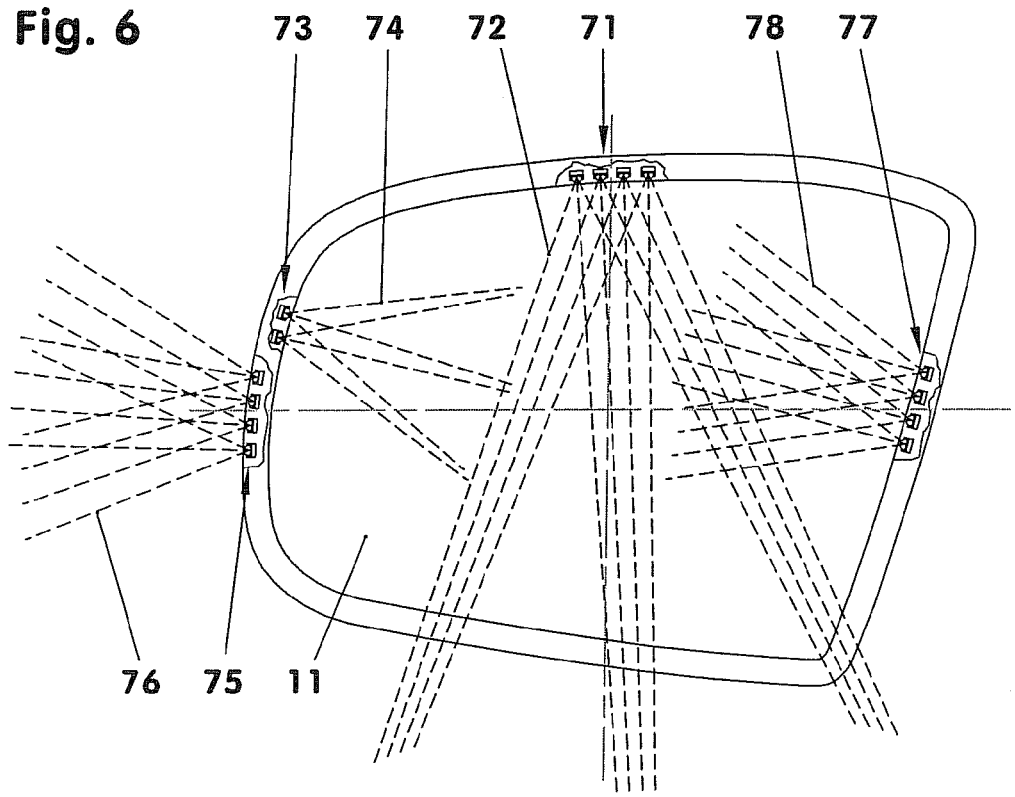
Figure 7:
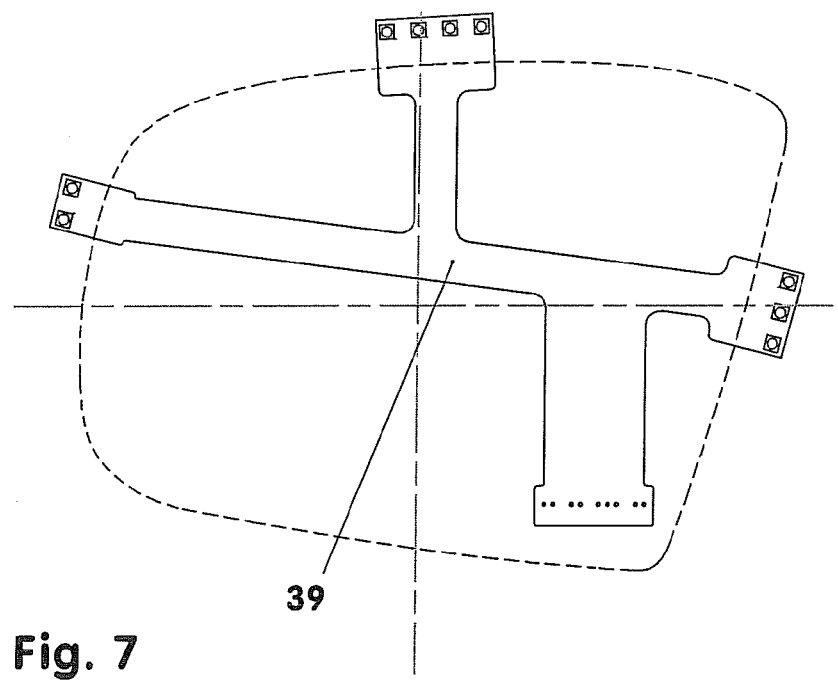
Figure 8:
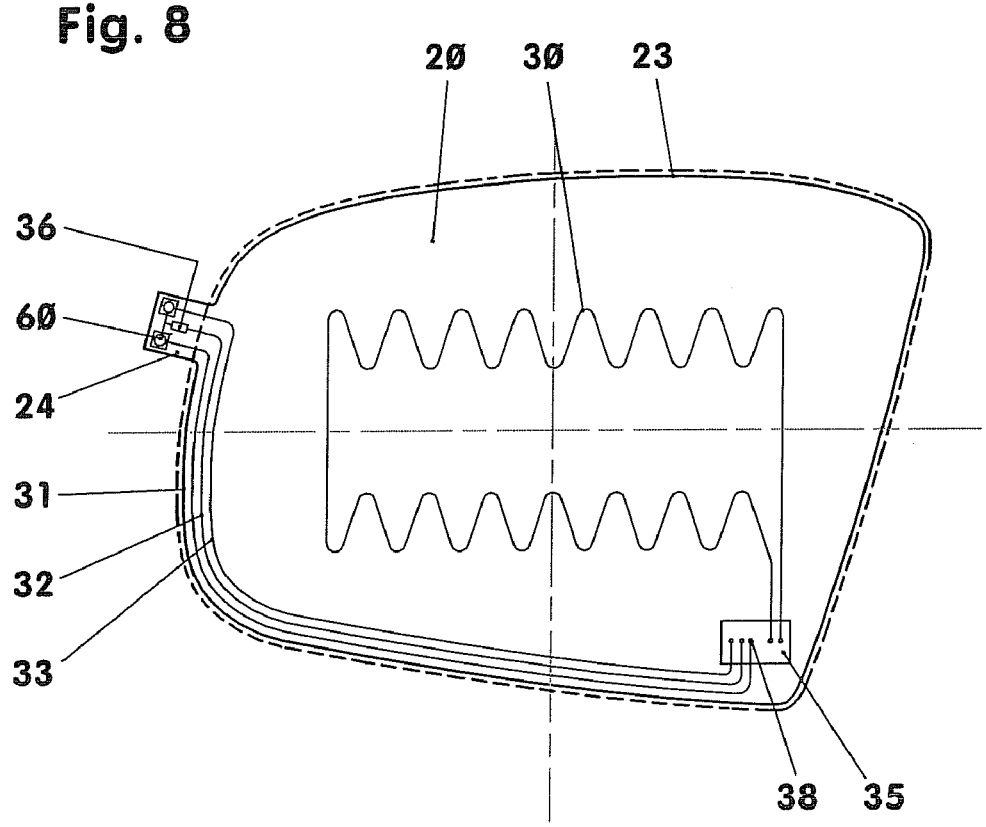
Figure 9:
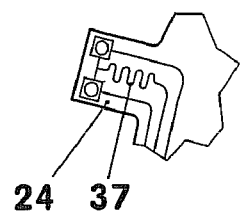

FIG. 1: Vehicle outside mirror module as seen from the mirror side;
FIG. 2: Partial section through the vehicle outside mirror module;
FIG. 3: Partial section with a diode emitting light toward the outside;
FIG. 4: Partial section with a diode emitting light toward the inside;
FIG. 5: Diode with light wave guide;
FIG. 6: Lighting directions of various diode configurations;
FIG. 7: Foil with conductive tracks leading to the diodes;
FIG. 8: Heating foil with conductive tracks leading to the diodes;
FIG. 9: Diode booster resistor of resistance wire.

FIG. 1 shows a vehicle outside mirror module which is comprised, among other things, of a mirror housing (1), a mirror glass (11), and of a mirror base cover (3) of a mirror base that is not represented.

In FIG. 2, a partial section is represented that is oriented as transverse to the mirror glass (11). Here, a mirror glass module (10) is laterally circumscribed and surrounded on the backside by the mirror housing (1) and by the case rim (2) which locks in or is adhered to said mirror housing. As a rule, the mirror glass module (10) is supported in the housing (1) so as to be adjustable. To this end, this mirror glass module (10) is seated inside of this case rim (2) with a certain amount of play.

According to FIG. 2, the mirror glass module (10) comprises a mirror glass support (50), an adhesive foil/film (40), a heating foil (20) with a diode (60), or a group of diodes and a mirror glass frame (51). The mirror glass (11) is secured on to the mirror glass support (50) by means of an adhesive foil/film (40) and of an equally adhesive heating foil (20). The adhesive film (40) is, for example, a sponge rubber or another type of thin walled elastomer body provided with an adhesive layer on both sides. During assembly, the heating foil (20) is adhered with its adhesive layer on to the back side (13) of the mirror glass (11). Then in turn, the adhesive film (40) is applied on to the heating foil (20) so as to join the mirror glass (11) with the mirror glass support (50). Possibly, for the purpose of mechanically securing the mirror glass (11) to the mirror glass support (50), the mirror glass frame (51) circumscribes the mirror glass support (50). To this end, the frame (51) has an outer edge section (54) which rests against the outer contour of the mirror glass support (50) and which projects forward over the outer side of the mirror glass (12). With the outer side of the mirror glass (12), the outer edge section (54) forms an angle that is smaller than or equal to an angle of 90 degrees. One to three millimeters before the outer side of the mirror glass (12), the frame (51) transitions over into a section (53) which is oriented parallel to the outer side of the mirror glass (12). This section (53), for example, of just a few millimeters in width extends into an inner edge section (52) which comes to rest at within about a 90 degree angle to the outer side of the mirror glass (12).

The mirror glass frame (51) and the mirror glass support (50) are, e.g., undetachably heat-sealed or bonded together.

Since the surface of the mirror glass (11) is smaller than the mirror glass support (50), the mirror glass support (50), the mirror glass frame (51) and the mirror glass (11) enclose a hollow chamber (58). In this hollow chamber (58), a partial area (24) of the heating foil (20) is located. The latter, for example, stands—angled at an angle of about 90 degrees— over the outer side of the mirror glass (12). In the overlapping area, on the side (21) of the heating foil (20) facing the back side of the mirror (13), light emitting diodes (60) are configured, for example, one row of several diodes—lying in consecutive sequence and perpendicular to the plane of the drawing.

In front of the main light exit opening (61) of the light emitting diodes (60), in the mirror glass frame (51), a window-like opening (55) is located. Through this opening (55) which, in the area of the inner edge section (52), extends from the outer side of the mirror glass (12) to the section (53) of the frame (51) that is parallel to the mirror glass, the lighting means (60) light up nearly parallel to the mirror glass (11) in the direction of the vehicle driver. The maximal opening angle of the light beams emitted (74) amounts, for example, to about an angle of 90 degrees. The light emitting diodes (60) configured in such a manner—in combination with a sensor system monitoring the rear roadway zone of the vehicle—have, for example, the function of a blind angle display that warns the driver of dangerous situations emerging in the blind angle zone. In FIG. 6, for example, two such diodes as a diode group (73) are represented.

Owing to the deep-lying configuration of the diodes (60) covered in the mirror glass frame (51) within the case rim (2), the signal effect of the lighting means (60) is well perceived even in bright sunlight. Also, other persons engaged in traffic will not become irritated.

The diodes (60) can also belong to the diode group (71), which, for example, can be activated at night when opening the driver or passenger door, thus acting as an aid to assist in exiting the vehicle or as a light source to illuminate the surroundings; see FIG. 6. Hereby, the projected light (72) is additionally intensified by the partial reflection in the mirror glass (11).

The diodes (60) are positioned and held in place in the hollow chamber (58) exclusively by the heating foil (20, 24). Since the upper area of the hollow chamber (58) is wider than the narrow spot between the mirror glass edge (14) and the mirror glass frame (51), the diodes (60) cannot slide beneath the mirror glass (11).

There also exists the possibility of forming the diodes (60) or of forming a block comprised of several diodes in such a manner that they exactly fit into the opening (55). The opening closed off in such a manner prevents the penetration of dirt and moisture into the frame (51). Possibly, the diodes have a sectional elastic sealing contour for sealing off.

In FIG. 3 is shown a mirror glass assembly group (10) in which the diode (60) or a diode group is configured on the underside (22) of the heating foil (20). The diode bearing end of the heating foil (20, 24) nearly entirely embraces the edge of the mirror (14). For example, the conductive tracks (31-33) that are oriented toward the mirror glass (11) make contact through to the other heating foil side (21) in order to establish an electrical connection for the diodes in those areas; see FIG. 8.

The main light exit surface (61) of the diode (60), represented, projects from the mirror glass (11) at an angle of about 45 degrees. Directly in front of it, an opening (55) is located which is located in the frame (51), in part in section (53) and in part in section (54). On average, the diodes (60) radiate light at angles of about 45 degrees from the normal midline of the mirror glass surface (12) away toward the mirror edge (14). The maximal opening angle of the beams (76) amounts, for example, to an angle of 90 degrees. Even these diodes (60) have, for example, the function of blind angle luminaries which can alert the driver from the inner lying outer mirror edge area (15). Possibly, said diodes can also be configured on the outer lying mirror edge area (16) as a positioning light or blinking light; see the diode group (75) from FIG. 6.

FIG. 4 shows the edge zone of a mirror glass assembly group with diodes (60) which, on average, beam out under an angle of 45 degrees, opposite the outer side of the mirror glass (12), from the mirror edge (14) toward the mirror center. Here as well, the diodes (60) are secured to the underside (22) of the heating foil (20, 24). In contrast to the type on inlay in FIG. 3, the heating foil (20, 24) extends further into the hollow chamber (58) and there, it is crimped over, for example, to form an angle of 135 degrees so that the diodes (60) together with their main light exit opening (61) are directed toward the middle of the mirror. Due to the additional crimping over of the heating foil (24), the diodes (60) are secured with free play based on the elasticity of the foils/films.

The use of these light emitting diodes (60) is comparable to the use of the diodes described in FIG. 2.

The mirror glass assembly groups (10) represented in FIGS. 2 through 4 have a mirror glass frame (51) which does not let light pass through with openings (55) lying in front of the diodes (60). In place of the openings (55), the mirror glass frame (51) in front of the main light exit openings (61) of the diodes (60) can even be designed to be transparent, glass clear or colored. As an alternative to the transparent spots, the frame (51) can also be designed as translucent in part, whereby the frame in the area of the diodes (60) does not change its frame color.

According to FIG. 5, a light emitting diode (60) with, for example, a formed or adhered light wave guide (64), is configured on the upper face (21) of the heating foil (20) which is not led around the edge of the mirror (14). In this form of embodiment, the light wave guide (64) embraces the edge of the mirror (14) in such a manner that its main light exit opening (65) has a light emitting behavior which largely corresponds to that of the diodes in FIG. 2. Possibly, the light wave guide surface (66) located outside of the main light exit surface (65) can be treated with a reflective coating or with chrome to better conduct the light and to prevent the reflection of poor or false light.

Instead of the mirror glass frame (51), the mirror glass (11) and the mirror glass support (50) are held together by means of several clips not represented here.

Cutouts can be arranged in the edge of the mirror (14) for the light wave guides (64) so that the installed light wave guides or light emitting diodes do not radially protrude beyond the edge of the mirror (14).

As an alternative, the entire hollow chamber (58) can be mold injected in sections to be a light wave guide.

FIG. 8 shows a heating foil (20) with a heating track (30), two diodes (60), a multiplier resistor (36), three conductive tracks (31-33) and one connector plug (35). The heating foil (20) has a wall thickness of about 0.15 to 0.3 millimeters. The heating track (30) is located in the middle area of the mirror with two laid out meandering segments. The heating track (30) ends on the back side of the mirror, in the right lower section in the connector plug (35). In place of a connector plug (35), the conductive tracks (31-33) and the heating track (30) can also end in individual connecting lugs to which current can then be supplied in the vehicle outside mirror module via the via springable contact bridges, if need be.

The heating track (30) has on the left edge the projecting tab (24) on which the diodes (60) and the multiplier resistor (36) are secured; also refer to FIGS. 2 and 6. In some cases, a damping diode can also be positioned there. For individual selection control, the two diodes (60) are connected to the connector plug (35), for example, via the three conductive tracks (31-33). The conductive tracks (31-33) largely run parallel to the edge (23) of the heating foil (20). The conductive tracks (31-33) are applied here on the side of the heating foil (20) on which the heating track (30) is configured. If several diode groups (71, 73, 75, 77) are connected on to the heating foil (20), at least one part of the conductive tracks can be applied to the side of the heating foil (20) on which the heating track (30) is not located. Given the case, the conductive tracks can also be configured on a separate conductive track foil (39), whereby this foil (39) is at least connected to the heating foil (30) in the area of the connector plug; refer to FIG. 7.

Of course, there is the possibility of installing the individual conductive tracks and heating tracks at different, electrically insulated planes of a multiple layer heating foil. Furthermore, the heating foil (20) can, at least in the edge areas or in the tab area, be covered over by an elastic insulating protective layer on one or both sides.

In FIG. 9, the tab (24) is represented in enlarged form. As a replacement for the soldered discrete resistor (36), for example, in surface mounting technology [SMD], a meandering laid out wire-wound resistor (37) is used as a component of the corresponding conductive track (32).

In addition, components for the electronic control of the mirror adjustment drives can be configured on the heating foil (20), for example, in the edge zones. Given the case, the heating foil can be reinforced in certain areas for receiving discrete electronic components such as integrated circuits [ICs].

REFERENCE NUMBER LIST

1 Mirror housing, vehicle outside mirror housing
2 Case rim
3 Mirror base cover
10 Mirror glass assembly group
11 Mirror glass
12 Mirror glass outer side, non-metal coated
13 Mirror back side, metal coated
14 Mirror edge
15 Mirror edge zone, turned toward the driver
16 Mirror edge zone, turned away from the driver
20 Heating foil
21 Heating foil side, oriented toward the mirror glass
22 Heating foil side, turned away from the mirror glass Underside
23 Heating foil edge
24 Tab, partial area
30 Heating track, heating element
31-33 Conductive tracks
35 Connector plug, power supply point
36 Multiplier resistor, conventional
37 Wire wound resistor, meandering
38 Power supply point
39 Conductive track foil
40 Adhesive foil
50 Mirror glass support
51 Mirror glass frame
52 Inner edge section
53 Section parallel to the mirror glass outer side
54 Outer edge section
55 Opening, frame window
58 Hollow chamber
60 Lighting means, light emitting diode
61 Main light exit surface
64 Light wave guide
65 Main light exit surface
66 Light wave guide surface
71 Lighting means group, diode group, top
72 Light beams to (71)
73 Lighting means group, inner edge, inside
74 Light beams to (73)
75 Lighting means group, outer edge, outside
76 Light beams to (75)
77 Lighting means group, inside edge, inside
78 Light beams to (77)

The invention claimed is:

1. A vehicle outside mirror module comprising:
a mirror glass (11) defining a front side (12), a back side and a mirror glass edge (14) extending thereabout, said front side (12) defining a plane;
a heating foil (20) flexibly configured on said back side of said mirror glass provided with power supply points (35) and including tabs (24) projecting out and away from said back side, wrapping around said mirror glass edge (14) and through said plane defined by said front side of said mirror glass (11), said heating foil receiving at least one heating element and at least one lighting source (60) disposed on one of said tabs (24) that extend beyond said mirror glass edge (14) and across said plane defined by said front side (12); and
at least one additional power supply point (38) integrated on said heating foil (20), having conductive tracks (31-33) extending between said light source (60) and said additional power supply points (38), said conductive tracks (31-33) providing current such that said light source (60) has at least one main light exit surface (61) whose spectral centroid lies forward of said plane of said front surface (12) and the mirror glass edge (14).

2. Vehicle outside mirror module according to claim 1, wherein said tabs (24) are long enough that they project over said front side (12) by at least one cross dimension of said light source (60).

3. Vehicle outside mirror module according to claim 2, thus characterized, that the mirror glass (11) is clamped in between a mirror glass support (50) and a mirror glass frame (51), secured to said support, embracing the mirror glass (11) on its front side (12).

4. Vehicle outside mirror module according to claim 3, thus characterized, that the mirror glass frame (51) exhibits a ring-shaped hollow chamber (58) leading along the edge of the mirror (14).

5. Vehicle outside mirror module according to claim 4, thus characterized, that the tabs (24) of the heating foil (20) equipped with said light source (60) are configured to exactly form-fit inside of the hollow chamber (58).

6. Vehicle outside mirror module according to claim 1 thus characterized, that the conductive tracks (31-33) are configured on the face of the heating foil (20) on which the heating element (30) is also configured.

7. Vehicle outside mirror module according to claim 1, thus characterized, that at least one part of the conductive tracks (32) leading to said light source (60) is designed as resistor wire (37).

8. Vehicle outside mirror module according to claim 1, thus characterized, that said light source (60) are a light emitting diode or a group of light emitting diodes on which a light wave guide (64) is formed.

* * * * *